Feb. 24, 1959 H. HAVSTAD 2,875,376

RESONANT CIRCUIT

Filed Sept. 2, 1955 3 Sheets-Sheet 1

INVENTOR
HARALD HAVSTAD
BY Alfred C. Hill
AGENT

Feb. 24, 1959 H. HAVSTAD 2,875,376

RESONANT CIRCUIT

Filed Sept. 2, 1955

3 Sheets-Sheet 2

INVENTOR
HARALD HAVSTAD
BY Alfred C. Hill
AGENT

INVENTOR
HARALD HAVSTAD
BY Alfred C. Hill
AGENT

United States Patent Office 2,875,376

Patented Feb. 24, 1959

2,875,376

RESONANT CIRCUIT

Harald Havstad, Allendale, N. J., assignor to International Telephone and Telegraph Corporation, Nutley, N. J., a corporation of Maryland Application September 2, 1955, Serial No. 532,293

20 Claims. (Cl. 315—43)

This invention relates to resonant circuits and more particularly to inductance elements disposed for resonance with the capacity between two adjacent electrodes of an electron discharge device.

In the past cavities and transmission lines have been used, almost exclusively, to obtain the inductive reactances necessary in the plate and cathode circuits of amplifiers operating in the 300 to 1600 megacycle range. Due to mechanical difficulties, the operation of these circuits has not been entirely satisfactory, particularly when a large tuning range must be covered. To obtain satisfactory tuning operation, it has been necessary to use precision machining methods which result in high cost and slow production schedules. The large physical sizes necessary to obtain good efficiency and low losses in power application have added complications to the actual design of specific equipments.

In a search for more suitable inductance elements in the above-mentioned frequency range, an investigation has been made using lumped inductances. One difficulty in using lumped inductances is to obtain the total inductances sufficiently small to resonate with given tube capacities and at the same time retain reasonable physical size. One way to accomplish this would be to connect in parallel many comparatively large inductances so that the total inductances would be of correct value. To get high Q or low losses the current distribution between the inductances should be about equal so that the current density would be equally divided per unit area, and this consideration would lead to parallel combinations of inductances of equal magnitudes. It is obviously impractical to provide circuits in which a large number of individual inductances are connected to the tube circuit.

Therefore, it is an object of this invention to obtain physical configurations for a structural member which will give a result equivalent to parallel combinations of lumped inductances.

Another object of this invention is to provide a structural element with given physical configurations coupled to one of a pair of adjacent electrodes of a discharge device to act as an inductance for resonance with the capacity between said electrodes, said physical structure being spaced from a reference potential surface.

A feature of this invention is to provide an electron discharge device having electrodes therein aligned in spaced relation along a given axis and an inductance element for resonance with the capacity between adjacent ones of said electrodes comprising a first conducting member coupled to one of said electrodes and a second conducting member coupled to the other of said electrodes and disposed in substantially parallel spaced relation to said first member, said second member extending a given distance in at least one direction from said given axis and having a given maximum width; the spacing of said first and second members, said maximum width and said given distance determining the inductance of said second member.

Another feature of this invention is the provision of a tapered member having a given radial distance from the axis of an electron discharge device and a given cord length for the arc described by said radial distance, said tapered element being in contact with one of a pair of electrodes of said device and in spaced parallel relation with a conductive reference plane coupled to a second electrode of said discharge device.

Other features of this invention include inductive elements of the type hereinabove described extending in opposite directions from the axis of the electron discharge device. The structurally formed inductive elements may have outer peripheries in the form of an arc, a straight line extending between the extremities of said given maximum distance and a series of straight lines approximating an arc whose given distance is the average distance from the axis of said discharge device.

The above-mentioned and other features and objects of this invention will become more apparent by reference to the following description taken in conjunction with the accompanying drawings, in which.

Figure 7:
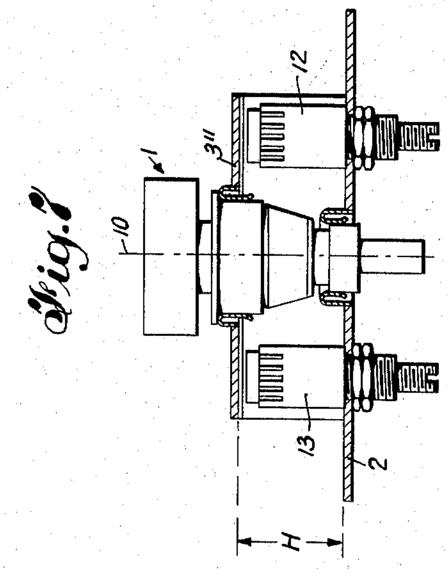
Figure 5:
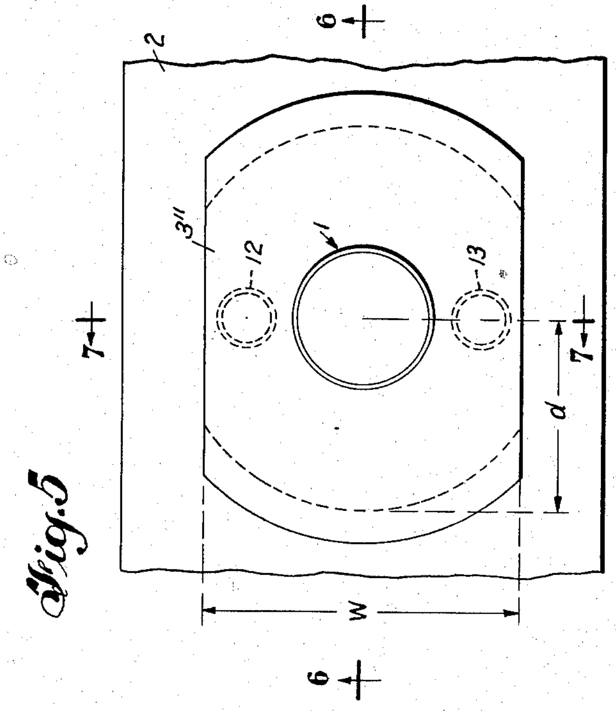
Fig. 5 is a plan view of still another embodiment of this invention.
Figure 6:
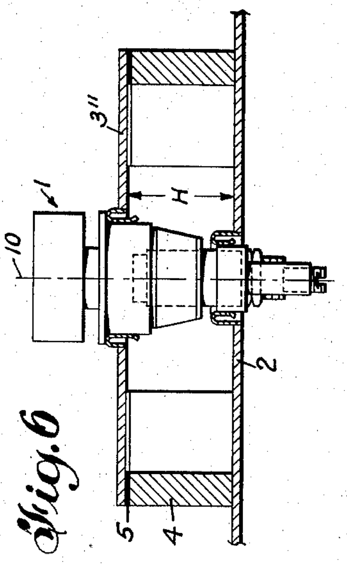
Figure 9:
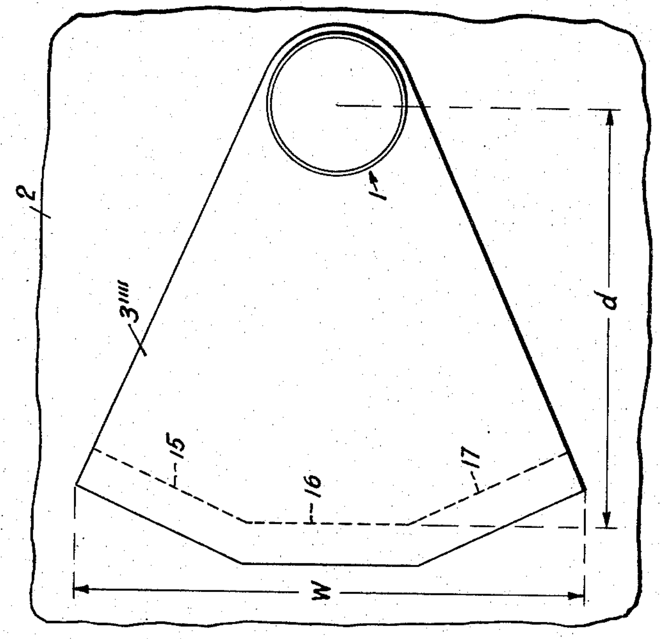
Figure 8:
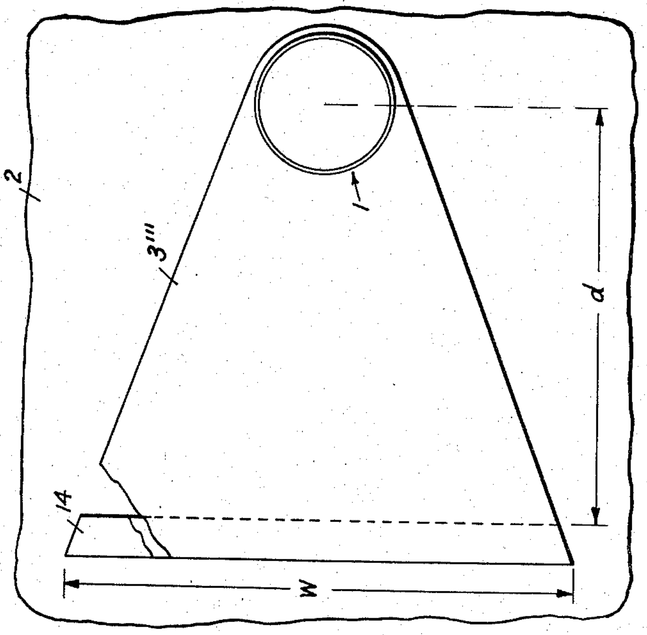

Figs. 6 and 7 are cross-sectional views taken along lines 6—6 and 7—7, respectively, of Fig. 5; and Figs. 8 and 9 are plan views of still other embodiments of this invention.

Figure 1:
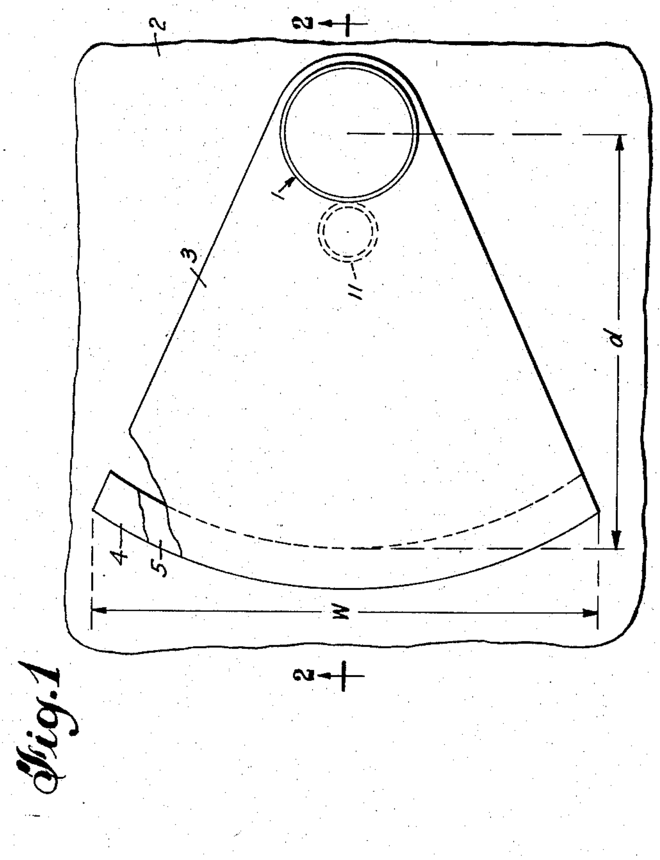
Fig. 1 is a plan view of an embodiment following the principles of this invention.
Figure 2:
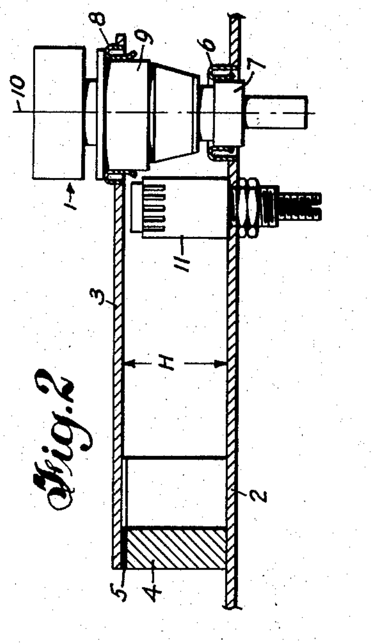
Fig. 2 is a cross-sectional view taken along line 2—2 of Fig. 1.

Referring to Figs. 1 and 2, there is disclosed a resonant cavity structure disposed in conjunction with electron discharge device 1 including a first conducting member 2 and a second conducting member 3 disposed in substantially spaced parallel relation to member 2. Member 3 is supported in its spaced relationship with member 2 by means of the arcuate member 4. Members 3 and 4 are electrically isolated by dielectric material 5 sandwiched therebetween.

Member 2 is at a reference potential which may be ground and/or chassis potential and is in contacting or coupled relationship with the control grid of device 1 by means of contacting element 6 and grid contacting surface 7. Member 3 is in contacting or coupled relation with the anode of device 1 by means of contacting element 8 and anode contacting surface 9. In this structural relationship, member 3 having predetermined dimensions will provide the amount of inductance necessary for resonance with the capacity between the anode and control grid of device 1. The amount of inductance contributed by member 3 depends upon the distance $d$ of member 4 from the axis 10 of the electrodes of device 1, the maximum width W of member 3, and the height H of member 3 above member 2. As illustrated in Fig. 1, the distance $d$ is a radial distance which describes adjacent the outer edge of member 3 an arc of radius $d$. The maximum width is the length of the cord of this arc. Another parameter which has an effect upon the inductance of member 3 is its height above member 2. However, this dimension cannot be varied much since the dimensions of device 1 normally dictate the height H. The inductance of member 3 may be adjusted by changing the width or the length of the cord W and/or by changing the radial distance $d$ to achieve that amount of inductance required for resonance with the electrode capacity of device 1 at the operating frequency.

In the resonant structure of Figs. 1 and 2, there is further provided a capacitive tuning adjustment 11 which enables the tuning of the resonant structure over a predetermined tuning range.

The spacing or supporting member 4, which may comprise one wall-like post or two or more posts, has several functions other than establishing the spacing and parallel relationship between members 2 and 3. This structure serves as a D. C. isolation between the anode potential of device 1 which is present on member 3 and the reference potential which is present on member 2. This member also provides a radio frequency short circuit between members 2 and 3 and thus defines the dimensions of the inductive element. Element 4 further acts as a shield to prevent the radiation of electric fields beyond the confines of member 4.

Figure 3:
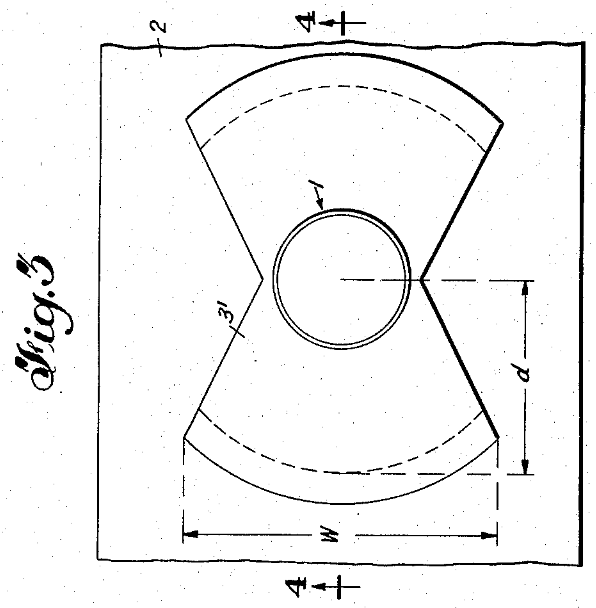
Fig. 3 is a plan view of another embodiment of this invention.
Figure 4:
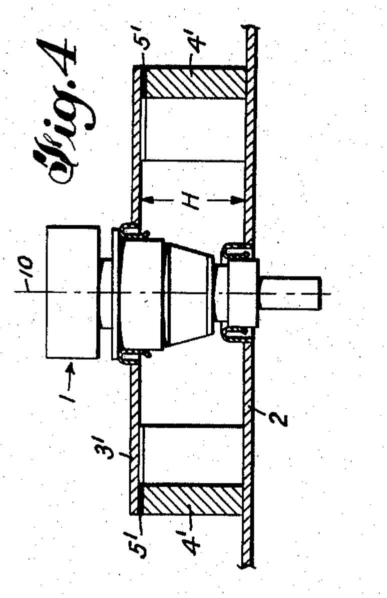
Fig. 4 is a cross-sectional view taken along line 4—4 of Fig. 3.

Figs. 3 and 4 illustrate a second embodiment of the inductance element of this invention for resonance with the interelectrode capacity of an electron discharge device of the planar electrode type. The same considerations set forth with respect to Figs. 1 and 2 hold for the embodiment of Figs. 3 and 4, the difference therebetween being in the configuration of the inductive element designated in Figs. 3 and 4 as 3'. All other elements have corresponding designations to those used in Figs. 1 and 2 and serve the same purpose. Member 3' extends in opposite directions from the axis 10 and is symmetrical thereabout. This double fan-like configuration may be used to resonate at a considerably higher frequency than the element of Figs. 1 and 2.

Figs. 5, 6 and 7 disclose another embodiment of this invention wherein the inductance element 3'' has a configuration very similar to that disclosed in Fig. 3 with the exception that the side boundaries extend straight across from the extremes of the cord of the arc described by the given distance rather than the tapered configuration illustrated in Fig. 3. With this configuration, dictated by the maximum width and radial distance, the device of Figs. 5, 6 and 7 enable the achievement of a maximum frequency of resonance of about 1200 megacycles. The two capacitive tuning slugs 12 and 13 provide a tuning range of 800 to 1200 megacycles.

The Q factor obtained with the inductance elements disclosed in Figs. 1, 3 and 5 are indicated to be better than 2000. The inductance range obtained with reasonable physical dimensions, that is, W and *d* less than 4 inches is about 0.150 microhenry to 0.005 microhenry. For instance, let us consider an example of the resonant frequency of the structure of Fig. 1 when the width, the distance and the height of member 3 is varied.

Example 1:
- $W=4''$
- $d=3\frac{1}{8}''$
- $H=1''$
- Tube=2C39A (micro-microfarad capacity)
- Resonance frequency=550 megacycles Example 2:
- $W=2\frac{1}{4}''$
- $d=3\frac{1}{8}''$
- $H=1''$
- Tube=2C39A (2 micro-microfarad capacity)
- Resonance frequency=465 megacycles Example 3:
- $W=1\frac{1}{2}''$
- $d=2\frac{1}{8}''$
- $H=1\frac{1}{16}''$
- Tube=2C39A (approximately 3.5 micro-microfarad capacity)
- Resonance frequency=515 megacycles Example 4:
- $W=4''$
- $d=2\frac{5}{8}''$
- $H=1''$
- Tube=2C39A (2 micro-microfarad capacity)
- Resonance frequency=650 megacycles The embodiments of Figs. 1, 3 and 5 illustrate the inductive element 3 as having a given radial distance and a given width or cord length for establishing the inductance of element 3 for resonance with the interelectrode capacity of electron discharge device. While these configurations of the inductive element provide the most efficient structure, that is, equal distribution of inductance per unit area and the lowest circuit loss, the performance of these circuits may be approximated by the embodiments of Figs. 8 and 9. In Fig. 8 the critical distance "*d*" is an average distance from the axis of the electron discharge device to the straight line of support 14 of element 3'''. The configuration of this inductive element is substantially triangular and the maximum width W would be the length of the base line of this triangular configuration, the length of straight line 14. The embodiment of Fig. 9 employs a series of straight line portions 15, 16 and 17 adjacent the outermost edge of inductive element 3''''. The straight line portions 15, 16 and 17 approximate an arc whose radius is equal to the distance from the axis of electron discharge device to this approximated arc, an average distance. In each of the embodiments of Figs. 8 and 9 the width W is the maximum width across the configuration of the inductive element 3.

Because the electric field of the various elements illustrated herein extends a considerable distance beyond the boundary of the configurations and the radiation resistance is very low at these frequencies, it is necessary to completely shield all elements connected with the tuning circuit. The necessary shielding arrangement has been eliminated from the drawings of this disclosure to more clearly present the configurations of the inductive elements of this invention.

Actual full-size working models of certain of the embodiments disclosed herein have been built for operation at a thousand megacycles using the 2C39A coplanar electron discharge device and a D. C. to R. F. plate circuit efficiency of up to 65% has been obtained. Other structures at 450 to 500 megacycles have been built and give about the same efficiency.

While I have described above the principles of my invention in connection with specific apparatus, it is to be clearly understood that this description is made only by way of example and not as a limitation to the scope of my invention as set forth in the objects thereof and in the accompanying claims.

I claim:

1. A resonant circuit comprising an electron discharge device having at least a pair of adjacent electrodes aligned in spaced relation along the longitudinal axis of said discharge device and an inductance element having a first conducting member coupled to one of said electrodes and disposed at right angles to said longitudinal axis and a second conducting member coupled to the other of said electrodes and disposed in substantially parallel spaced relation to said first member, said second member extending a given distance in at least one direction from said longitudinal axis and having a given maximum width, the spacing of said first and second members, said maximum width and said given distance determining the inductance of said element, said first and second members having negligible capacity therebetween at the operating frequency.

2. An element according to claim 1, wherein said given distance is a radial distance from said longitudinal axis and said given maximum width is the length of the cord of the arc described by said radial distance.

3. An element according to claim 1, further including a third conducting member disposed between said first and second members and said given distance is the average distance to the inner surface of said third member.

4. An element according to claim 3, wherein the inner surface of said third member defines a straight line extending between the extremes of said given maximum width.

5. An element according to claim 3, wherein the inner surface of said third member defines a series of straight lines approximating the curvature of an arc whose radius is said average distance.

6. An element according to claim 1, wherein said second member extends said given distance in opposite directions from said given axis.

7. An element according to claim 6, wherein said given distance is a radial distance from said longitudinal axis and said given maximum width is the length of the cord of the arc described by said radial distance.

8. An element according to claim 6, further including a third conducting member disposed between said first and second members and said given distance is the average distance to the inner surface of said third member.

9. An element according to claim 8, wherein the inner surface of said third member defines a straight line extending between the extremes of said given maximum width.

10. An element according to claim 8, wherein the inner surface of said third member defines a series of straight lines approximating the curvature of an arc whose radius is said average distance.

11. An element according to claim 6, wherein said second member is tapered from said given maximum width to substantially the width of said other of said electrodes.

12. An element according to claim 11, wherein said given distance is a radial distance from said longitudinal axis and said given maximum width is the length of the cord of the arc described by said radial distance.

13. An element according to claim 11, further including a third conducting member disposed between said first and second members and said given distance is the average distance to the inner surface of said third member.

14. An element according to claim 1, wherein said second member is tapered from said given maximum width to substantially the width of said other of said electrodes.

15. A resonant circuit comprising an electron discharge device having a pair of adjacent electrodes aligned in spaced relation along the longitudinal axis of said discharge device, the interelectrode capacity between said pair of electrodes constituting the capacitive element of said resonant circuit, and an inductance element including a first conducting member coupled to one of said electrodes and disposed at right angles to said longitudinal axis and a second conducting member coupled to the other of said electrodes and disposed in substantially parallel spaced relation to said first member, said second member extending a given distance in at least one direction from said longitudinal axis and having a given maximum width, the spacing of said first and second members, said maximum width and said given distance determining the inductance of said inductance element for resonance with said capacitance element, said first and said second members having negligible capacity therebetween at the operating frequency.

16. An element according to claim 15, wherein said given distance is a radial distance from said longitudinal axis and said given maximum width is the length of the cord of the arc described by said radial distance.

17. An element according to claim 15, further including a third conducting member disposed between said first and second members and said given distance is the average distance to the inner surface of said third member.

18. An element according to claim 17, wherein the inner surface of said third member defines a straight line extending between the extremes of said given maximum width.

19. An element according to claim 17, wherein the inner surface of said third member defines a series of straight lines approximating the curvature of an arc whose radius is said average distance.

20. A resonant circuit comprising an electron discharge device having at least a pair of adjacent electrodes aligned in spaced relation along the longitudinal axis of said discharge device, the interelectrode capacity between said pair of electrodes constituting the capacitive element of said resonant circuit, and an inductance element including a first planar conducting member coupled to one of said electrodes and disposed at right angles to said longitudinal axis, a second planar conducting member coupled to the other of said electrodes and disposed in substantially parallel spaced relation to said first member, said second member extending a given distance in at least one direction from said longitudinal axis and having a given maximum width, the spacing of said first and second members, said maximum width and said given distance determining the inductance of said inductance element for resonance with said capacitive element and a third conducting member disposed between said first and second members at said given distance to establish a direct current isolation relationship and a radio frequency shorting relationship between said first and second members, said first and second members having negligible capacity therebetween at the operating frequency.

References Cited in the file of this patent

UNITED STATES PATENTS

| | | |
|---|---|---|
| 2,353,742 | McArthur | July 18, 1944 |
| 2,400,753 | Haeff | May 21, 1946 |
| 2,410,109 | Schelleng | Oct. 29, 1946 |
| 2,451,502 | Lisman et al. | Oct. 19, 1948 |
| 2,551,672 | Harris et al. | May 8, 1951 |
| 2,583,027 | Taylor | Jan. 22, 1952 |